Patented Jan. 26, 1937

2,068,995

UNITED STATES PATENT OFFICE 2,068,995

COATING AND METHOD OF PROTECTING SURFACES AGAINST CORROSION

Kenneth Edward Hunter Rodwell, London, England, assignor to Rangi Limited, Nairobi, Kenya, East Africa, a corporation of Kenya Colony, East Africa No Drawing. Application December 3, 1934, Serial No. 755,781. In Great Britain December 12, 1933

7 Claims. (Cl. 91—68)

This invention relates generally to coatings and to methods of protecting surfaces against corrosion, and more particularly to anti-corrosive coatings in combination with surfaces of metallic members and the like normally subjected to the elements, and also to methods of applying said anti-corrosive coatings to such surfaces.

It has been found that when conventionally coated iron and steel surfaces—for example, the surfaces of members normally subjected to the action of sea water, atmospheric conditions and the like have been in use for a relatively short period of time, the action of the elements causes the coating to break down and thereby subject the surfaces to deleterious corrosive effects. Furthermore, the cost of covering the above mentioned members with conventional protective coatings is relatively high, and hence such coatings find only a limited application inasmuch as many installations will not warrant the added high cost of their application.

It is, therefore, one of the primary objects of the present invention to overcome the above mentioned and numerous other disadvantages and inconveniences heretofore experienced, and to this end it is proposed to provide a relatively inexpensive coating material and improved simple methods of expeditiously applying such coating materials to the surfaces of iron, steel and the like, which are normally subjected to severe corrosive atmospheric conditions.

Another object of the present invention is to provide coatings and methods of applying same as generally set forth above, which will not only effectively protect the coated surfaces against the elements but which will also provide a coating having an attractive, glossy, smooth finish.

More specifically, the present invention contemplates a coating containing a natural or artificial bituminous material as the essential constituent in combination with cement, said constituents being applied in a very definite manner so as to positively insure permanence and durability after it has once been applied to the surface of the work.

A further object of the present invention is to provide improved methods whereby coating material such as material in which the essential constituents are cement and natural or bituminous substances, may be effectively applied in several stages. More particularly, the invention contemplates the application of materials in three stages, the first stage consisting in the application of the ground coating of cement, and allowing it to stand until it is dry to the touch; the second stage consisting in applying a coating containing natural or artificial bituminous material to the ground coating of cement before said ground coating has completely hardened and set; and a third stage consisting in applying a top coating of bituminous material and cement to the second coating.

Numerous other objects and advantages will be more apparent from the following detailed description.

In practicing the method of the present invention, the surface to be coated or treated—for example, the metallic surface of a vessel, pontoon or the like is first thoroughly cleaned. A coating of cement is then applied to the cleaned surface. The cement may, if desired, be mixed with alkali or alkaline substances or pigments, or several of these, and is mixed with water into a paste, in which form it may be applied to the surface in any suitable manner—for instance, by brush or by spraying. This cement paste should be freshly prepared and should be applied immediately after mixing. It has been found preferable to use Portland cement and water mixed to give a thick cream or paste.

Immediately after the layer of cement has become dry to the touch, the second or intermediate coating of natural or artificial bituminous material is applied. The time taken for the cement coating to dry depends to some extent upon the cleaning treatment to which the surface has been subjected. Thus, in instances where the surface has been sand blasted, the cement layer becomes dry to the touch in a shorter time than when the surfaces are scraped and wire brushed. Ordinary tar has been found suitable for the intermediate coating but, in order to facilitate its application it is preferably diluted with a small quantity of oil for thinning purposes, preferably a mineral oil. When the mixture of tar and oil is used, the two constituents should be well stirred so as to insure good mixing.

When the second or intermediate bituminous coating is set and dry, the third or final coating is applied. This final coating may consist of a mixture of tar and cement, and, as previously suggested, it is desirable in certain instances to add a thinning oil to the tar to facilitate the application thereof. Particular attention is directed to the fact that the cement should not be mixed with the tar until it is required for use, and the mixture should be well stirred so as to secure good mixing of the tar and cement. Obviously, other substances may be added to this mixture to modify certain of the physical characteristics of the surface, for example, a suitable pigment may be mixed with the tar and cement to afford any desired color. The presence of mineral oil in the outer layer or coating has the additional advantage of preventing the growth of barnacles or the like, and this is of particular importance when the above described coating and method are employed for pontoons or vessels used in salt water.

It has been found practical to apply a cold, second coating consisting of five parts by volume of refined coal tar and one part of kerosene or like boiling fraction, care being exercised to thoroughly mix the tar and kerosene. When this coating is set and dry a final coating consisting of the same mixture to which has been added two parts by volume of Portland cement, just before use, is applied and is then left to completely dry. The resultant coating is glossy and attractive in appearance and shows no tendency to crack when subjected to sudden changes in temperature. Moreover, it has considerably good wearing properties and shows no tendency to lose its glossiness or smoothness with the passing of time.

Of course, a further coating may be applied to the third layer—for example, bituminous paint to give the resulting surface the desired appearance. However, owing to the glossiness and the smoothness of the third layer described above, no such further coating is, under ordinary circumstances, necessary.

From the foregoing it will be apparent that the present invention contemplates a combined cement and bituminous coating, which is extremely resistant to corrosive effects and which tends to maintain an attractive, glossy appearance over an extended period of time. It is of the utmost importance in practicing the method described herein that the first coating of cement should be dry to the touch before applying the second coating. In other words, the first coating of cement must be sufficiently dry and yet not completely set in order to prevent separation thereof when the second coating is applied.

If the second coating is applied before the moisture in the first coating has evaporated sufficiently, portions of the first coating may shift along the metallic surface so that the application of the second coating will fail to render the intimate mixing or junction of the first and second coatings, which is essential for success in resisting corrosive effects. In other words, unless the ground coating of cement is given sufficient time to dry and yet not to completely set, it may become removed in places from the metallic surface, so that, when the second coating is applied, it will in those places directly contact the metallic surface instead of the cement. Under such circumstances, the resistance to corrosive effects presented by the combined layers of cement and bituminous material is not obtained. However, if the ground coating of cement is dry to the touch at the time the second coating is applied, a uniform, unbroken combined layer of cement and bituminous material results.

While reference has been made herein to specific steps in methods, as well as to specific materials which may be employed in practicing the methods, it should be understood that the invention is not limited to such steps and materials, but is capable of other modifications and changes without departing from the spirit and scope of the appended claims.

Having thus described my invention, what I claim as new and desire to secure by Letters Patent is:

1. In combination with a metallic surface to be protected against corrosion, a layer of cement contacting directly with said surface, a layer of bituminous material intimately associated with said layer of cement, and a layer including bituminous material and cement associated with said second mentioned layer whereby to present a coating for effectively resisting corrosive effects of the elements.

2. In combination with a metallic surface to be protected against corrosion, a layer of cement contacting directly with said surface, a layer consisting of bituminous material and mineral oil intimately associated with said layer of cement, and a layer including bituminous material, mineral oil and cement associated with said second mentioned layer whereby to present a coating for effectively resisting corrosive effects of the elements.

3. The method of protecting a surface against corrosion which includes the steps of applying a coating of cement to the surface, permitting moisture in the cement to evaporate without completely causing said cement to harden and set, applying a coating including primarily bituminous material to the cement coating, and applying a coating comprising a bituminous material and cement to the last mentioned coating.

4. The method of protecting a surface against corrosion which includes the steps of applying a coating of cement to the surface, applying a coating including primarily a mixture of tar and thinning oil to the cement coating when the latter is dry to the touch but before it has completely hardened and set, and applying a coating comprising a bituminous material and cement to the last mentioned coating.

5. The method of protecting a surface against corrosion which includes the steps of applying a coating of cement to the surface, applying a coating including primarily bituminous material to the cement coating when the latter is dry to the touch but before it has completely hardened and set, and applying a coating comprising a bituminous material, thinning oil, and cement to the last mentioned coating.

6. The method of protecting a surface against corrosion which includes the steps of applying a coating of cement to the surface, applying a coating including primarily refined coal tar to the cement coating when the latter is dry to the touch but before it has completely hardened and set, and applying a coating comprising refined coal tar and cement to the last mentioned coating.

7. The method of protecting a surface against corrosion which consists in applying a coating of cement to the surface, permitting moisture in the cement to evaporate without completely causing said cement to harden and set, applying a coating including substantially five parts of refined coal tar to one part of kerosene or like boiling fraction by volume, and applying a third coating containing substantially five parts of refined coal tar and one part of kerosene or like boiling fraction to two parts Portland cement by volume.

KENNETH EDWARD HUNTER RODWELL.